Patented May 1, 1934

1,956,559

UNITED STATES PATENT OFFICE 1,956,559

RESINOUS PRODUCT AND PROCESS OF MAKING SAME

Theodore F. Bradley, Westfield N. J., assignor to Ellis-Foster Company, Montclair, N. J., a corporation of New Jersey No Drawing. Application September 3, 1924, Serial No. 735,597

17 Claims. (Cl. 260—8)

This invention relates to a resinous product new to the art and a process for the manufacture of same. This product is suitable for use in nitrocellulose and cellulose acetate lacquers and may be used for various other purposes such as for shellac substitutes, as a resinous binder for molding composition and for many other uses in the various arts.

While it is known that glycerol will react with phthalic anhydride to form a resin and often will react with other polybasic acids to form other resins, it is not generally known that these resins are entirely unsuitable for use in nitrocellulose and cellulose acetate lacquers. Such however is the case and the inherent faults of these polybasic acid resins are first—a high content of free acid, and second—poor and very limited solubility. For example when molecular proportions of phthalic anhydride and glycerol are reacted a rather pale colored resin is obtained which is soluble in acetone and in a mixture of equal parts denatured alcohol and benzol, but insoluble in ethyl, butyl and amyl acetates. This prevents the successful use of this resin in nitrocellulose and cellulose acetate lacquers since the high boiling nitrocellulose solvents are precipitants for the resin. This resin has a high acid number, usually about 140 and this causes corrosion of brass and other metals. Long continued heat treatment at temperatures under 200° C. or shorter heating at higher temperatures cause a decrease in the acid number but the solubility becomes poorer and poorer as the reaction is brought nearer to completion. I find that many other di- and tri-basic acids act in much the same way so that use of citric, tartaric and other acids of a like nature offer no advantage. Alteration of the proportions of ingredients used will affect to some extent the acidity, melting point and solubility but in no case is a resin produced which is soluble in the high boiling nitrocellulose solvents.

My research has shown that the solubility of these glyceride resins is in general largely determined by the solubility of the particular acid used as well as by the proportion of same. This principle is of great importance and it is upon said principle that the invention is based. For example to secure a water soluble resin I utilize a water soluble acid either alone or in such proportion with other acids that the water soluble acid predominates. To secure a resin soluble in butyl acetate an acid must be used which is soluble in this solvent. Accordingly I found that benzoic acid reacted with glycerol to form a rather soft resinous product, which unlike the resins from the polybasic acids was soluble in ethyl, butyl and amyl acetates. This product was too soft to be used as a resin. Combination of the proper proportions of benzoic and phthalic acids with glycerol however produced a satisfactory resin which was soluble in all the necessary solvents, fairly hard and of low acidity.

I found that if too much phthalic anhydride be used the resin will be too acid and insoluble in butyl acetate etc., while if too much benzoic acid be used the resin will be too soft. I found that a resin having the desired properties must contain benzoic acid and phthalic anhydride in approximately equal molecular proportions and while slight variations can be made no resin will be satisfactory which has over one and one-half mols. of either acid in excess of the other. In practice I prefer to use a slight excess of glycerol in order to insure the production of a resin with low acidity. For example 94 parts (by weight) of glycerol is heated with 112 parts phthalic anhydride and 122 parts of benzoic acid. When the acids have melted the reaction mixture is placed under a 28 inch vacuum and heating continued. The temperature is gradually raised to 290° C. at which point heating is discontinued but vacuum maintained until temperature has dropped to 200° C. Provision is made for the recovery of sublimed acid. The vacuum treatment is of value in that it tends to prevent discoloration of the resin and to considerably reduce the acidity of the final product. The resin made in the laboratory by this method was very pale in color, soluble in butyl, amyl and ethyl acetates and also in acetone or mixtures of equal parts denatured alcohol and benzol. The resin was brittle when cold but softened somewhat when held in the hand for a few moments. It has no definite melting point but softens very easily. The acid number was 17.2 and it was found that this resin mixed well with nitrocellulose or cellulose acetate to give good lacquer coatings. The resin can be made slightly harder by slightly increasing the percentage of phthalic anhydride, or softer by an increase in the percentage of the benzoic acid. In no case however can more than a slight excess of either be used without changing the solubility and entire nature of the resin.

This resin may be dissolved in alcohol-benzol mixtures and used as a shellac substitute or may be incorporated with wood flour, cotton linters, etc. and used for molding work.

If the phthalic anhydride be substituted by other organic acids other resins will be produced each of which will possess distinctive characteristics. For example if the phthalic anhydride be replaced by tartaric acid and resin is made by the same procedure a resin of somewhat darker color is produced. When 67½ parts tartaric acid are combined with 47 parts glycerol and 49 parts of benzoic acid a resin is produced which is very easily dispersed by water and is insoluble in the usual high boiling nitrocellulose solvents. Thus while this particular resin is not suitable for use in nitrocellulose it however can be used for various purposes in the other arts. It will be seen therefore that each particular acid produces a resin having distinctive properties and in each case applicable for various special purposes. My research has also disclosed the fact that in order to secure a glyceride resin of low acidity and soluble in the usual high boiling nitrocellulose solvents a resin must be used whose acid constituent or one of whose acid constituents is soluble in these solvents. Since the monobasic organic acids are soluble in the usual nitrocellulose solvents one of the acids used should preferably be of this character. For example lactic and abietic (rosin) acids can be used in place of benzoic if desired.

By the processes disclosed herein and choice of operating conditions as set forth, it is a relatively simple matter to obtain resins of relatively low acid number, for example not exceeding 35, and preferably from 12 to 20.

In place of glycerol I may utilize polyglycerol or the several glycols such as ethylene and propylene glycols. Chlorhydrins may also be used. The use of polyglycerol tends to produce a harder resin and the glycols and chlorhydrins produced softer resins than when glycerol was used.

A resin was prepared from glycol as follows: 65 grams of the mixed ethylene and propylene glycols were heated with 148 grams of phthalic anhydride to a temperature of 210° C. over a period of one-half hour. A soft alcohol soluble resin miscible with nitrocellulose and soluble in the usual high boiling nitrocellulose solvents was obtained.

By the term "polyhydric alcoholic ingredient" as used in the claims, is meant materials such as glycerol, glycols, or their halogen derivatives such as chlorhydrins.

What I claim is:—

1. As a new product benzoic phthalic glyceride resin having an acid number not exceeding 35.

2. As a new product benzoic phthalic glyceride resin having an acid number between 12 and 20.

3. As a new product benzoic phthalic polyglyceride in resinous form.

4. The process of manufacturing a resinous product comprising the heat treatment of a glycerol, phthalic anhydride and benzoic acid under vacuum.

5. The process of manufacturing a resinous product comprising the heat treatment of approximately 94 parts by weight of glycerol, 112 parts phthalic anhydride and 122 parts of benzoic acid under vacuum.

6. The process of manufacturing a resinous product comprising the heat treatment of glycerol, benzoic acid and another organic carboxylic acid under vacuum.

7. The process of manufacturing a resinous product comprising the heat treatment of glycerol, a monobasic organic acid and another organic carboxylic acid under vacuum.

8. The process of manufacturing a resinous product comprising the heat treatment of polyglycerol, benzoic acid and another organic carboxylic acid under vacuum.

9. A process of making glyceride resins which comprises reacting organic carboxylic acids with polyhydric alcohols and controlling the solubility of the resulting resinous material by choice of the organic acids.

10. A process of making glyceride resins which comprises reacting a plurality of organic carboxylic acids with polyhydric alcohols and controlling the solubility of the resulting resinous material by adjusting the ratio of the plurality of acids, one to the other.

11. A process of making glyceride resins which comprises reacting organic carboxylic acids with glycerol and controlling the solubility of the resinous material by choice of the organic acids used.

12. A process of making resinous material of controlled solubility which comprises reacting glycerol with a plurality of organic carboxylic acids, the proportions of the acids used relatively one to the other and the type of acid ingredients being such as to yield a product of predetermined solubility.

13. A process of making resinous material which comprises heating glycerol and a plurality of organic carboxylic acids under a vacuum to a temperature of 290° C.

14. A process of making resinous material which comprises heating glycerol and a plurality of organic carboxylic acids under a vacuum to a temperature of 290° C., discontinuing the heating, and maintaining the vacuum until the temperature has dropped to 200° C.

15. A resinous material produced from glycerol and a plurality of organic carboxylic acids, the ratio of the acids to each other not being in excess of more than one and one-half moles.

16. A resinous material produced from glycerol and approximately molecular proportions of phthalic anhydride and benzoic acid.

17. An ethylene glycol derivative of phthalic acid and lactic acid.

THEODORE F. BRADLEY.